(12) United States Patent
Zhu et al.

(10) Patent No.: US 11,611,970 B2
(45) Date of Patent: *Mar. 21, 2023

(54) ADAPTIVE RESOURCE ALLOCATION FOR MEDIA STREAMS OVER WIRELESS

(71) Applicant: Cisco Technology Inc., San Jose, CA (US)

(72) Inventors: Xiaoqing Zhu, Austin, TX (US); Wai-tian Tan, Sunnyvale, CA (US); Herb Wildfeuer, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,103

(22) Filed: Mar. 8, 2021

(65) Prior Publication Data

US 2021/0195607 A1 Jun. 24, 2021

Related U.S. Application Data

(63) Continuation of application No. 16/555,501, filed on Aug. 29, 2019, now Pat. No. 10,966,216.

(51) Int. Cl.
*H04W 72/08* (2009.01)
*H04W 72/12* (2023.01)
(Continued)

(52) U.S. Cl.
CPC ......... *H04W 72/085* (2013.01); *H04L 5/0007* (2013.01); *H04L 65/60* (2013.01); *H04W 72/1242* (2013.01)

(58) Field of Classification Search
None
See application file for complete search history.

(56) References Cited

U.S. PATENT DOCUMENTS 6,230,200 B1 * 5/2001 Forecast ................... G06F 9/50
709/219
8,831,091 B2 9/2014 Macinnis et al.
(Continued)

FOREIGN PATENT DOCUMENTS

KR 100652574 B1 12/2006

OTHER PUBLICATIONS

Zhi Li et al., "Probe and Adapt: Rate Adaptation for HTTP Video Streaming at Scale", Jul. 7, 2013.
(Continued)

*Primary Examiner* — Jamaal Henson
(74) *Attorney, Agent, or Firm* — Baker Botts L.L.P.

(57) ABSTRACT

A method is provided in a wireless access point in a wireless communications network. The method includes obtaining information characterizing a first wireless stream and the second wireless stream transmitted or received by the wireless access point. The information includes at least a wireless channel quality for each of the first wireless stream and the second wireless stream. The method further includes allocating transmission resources to the first wireless stream and the second wireless stream based on the obtained information. In response to a change in quality of the first wireless stream, the method further includes revising the allocation of transmission resources for the first wireless stream based on at least one of a target bit-rate and a target level of smoothness.

20 Claims, 5 Drawing Sheets

(51) Int. Cl.
*H04L 5/00* (2006.01)
*H04L 65/60* (2022.01)

(56) References Cited

U.S. PATENT DOCUMENTS

| | | | |
|---|---|---|---|
| 9,143,950 B2* | 9/2015 | Peleg | H04W 16/28 |
| 2002/0010938 A1* | 1/2002 | Zhang | H04N 21/2662 |
| | | | 375/E7.005 |
| 2002/0054578 A1* | 5/2002 | Zhang | H04L 1/0018 |
| | | | 370/335 |
| 2004/0240390 A1 | 12/2004 | Seckin | |
| 2006/0255989 A1* | 11/2006 | Kim | H04L 1/0036 |
| | | | 341/120 |
| 2007/0190951 A1* | 8/2007 | Lampinen | H04B 7/061 |
| | | | 455/562.1 |
| 2008/0037679 A1* | 2/2008 | Khan | H04B 7/0697 |
| | | | 375/267 |
| 2008/0069201 A1 | 3/2008 | Zhu et al. | |
| 2010/0202391 A1* | 8/2010 | Palanki | H04W 72/0426 |
| | | | 370/329 |
| 2012/0002634 A1* | 1/2012 | Seok | H04W 72/085 |
| | | | 370/329 |
| 2014/0079030 A1* | 3/2014 | Van Parys | H04W 28/10 |
| | | | 370/336 |
| 2015/0327217 A1* | 11/2015 | Aboul-Magd | H04W 72/02 |
| | | | 370/329 |
| 2016/0329999 A1* | 11/2016 | Li | H04L 5/0053 |
| 2017/0325202 A1* | 11/2017 | Verma | H04L 5/0053 |

OTHER PUBLICATIONS

V. Gupta, C. Gutterman, Y. Bejerano, G. Zussman, "Experimental evaluation of large scale WiFi multicast rate control," IEEE Trans. Wireless Comm. vol. 17 (4), Apr. 2018.

D. Marrero, E. Macias, "An Admission Control and Traffic Regulation Mechanism for Infrastructure WiFi networks," IAENG Int. J. of Computer Science, 35:1, 2008.

S. Aditya, S. Katti, "FlexCast: graceful wireless video streaming," ACM MobiCom 2011.

C. Chen, X. Zhu, G. de Veciana, A. C. Bovik, and R. W. Heath, "Adaptive Video Transmission with Subjective Quality Constraints", in Proc. IEEE International Conference on Image Processing (ICIP'14), Paris, France. Oct. 2014.

C. Chen, L.K. Choi, G. de Veciana, C. Caramanis, R.W. Heath, Jr. and A.C. Bovik, "Modeling the Time-Varying Subjective Quality of HTTP Video Streams With Rate Adaptations," IEEE Transactions on Image Processing, vol. 23, No. 5, May 2014.

Z. Guo, Y. Wang, and X. Zhu, "Assessing the Visual Effect of Non-periodic Temporal Variation of Quantization Step-size in Compressed Video", in Proc. IEEE International Conference on Image Processing (ICIP'15), Quebec City, QC, Canada. Oct. 2015.

* cited by examiner

ADAPTIVE RESOURCE ALLOCATION FOR MEDIA STREAMS OVER WIRELESS

PRIORITY

This application is a continuation, under 35 U.S.C. § 120 of U.S. patent application Ser. No. 16/555,501 filed on Aug. 29, 2019 entitled "ADAPTIVE RESOURCE ALLOCATION FOR MEDIA STREAMS OVER WIRELESS", which is hereby incorporated by reference in its entirety.

TECHNICAL FIELD

Certain embodiments of the present disclosure relate, in general, to wireless communications systems, and, in particular, to media streams over wireless networks.

BACKGROUND

Media streams, e.g., audio or video streams such as Netflix over HTTP-based adaptive streaming, WebEx conference calls, or streaming of augmented/virtual reality content are increasingly handled over wireless networks. Accordingly, wireless networks must manage the allocation of resources to the media streams while also balancing the resources allocated to other transmissions over the wireless network. In some situations, the capacity of the wireless channel over which the media stream is transmitted may change over time, e.g., due to movement in the environment (e.g., a person walking by blocking the main path of reception) and/or due to the movement of the streaming device (e.g., a user moving within a shopping mall using an alternative reality application to gather additional information regarding merchandise).

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

According to an embodiment, a method is provided in a wireless access point in a wireless communications network. The method includes obtaining information characterizing a first wireless stream and the second wireless stream transmitted to or from the wireless access point. The information includes at least a wireless channel quality for each of the first wireless stream and the second wireless stream. The method further includes allocating transmission resources to the first wireless stream and the second wireless stream based on the obtained information. In response to a change in quality of the first wireless stream, the method further includes revising the allocation of transmission resources for the first wireless stream based on at least one of a target bit-rate and a target level of smoothness.

As described in detail herein, one or more embodiments provided in this disclosure may include one or more technical advantages or solutions to existing technical problems. As one example, certain embodiments improve the perceived quality of a media stream by smoothing out resource allocation in the event of a temporary quality drop. In contrast to conventional techniques that result in sudden and persisting drops in bit-rates, certain embodiments may adjust the normal resource allocation to provide short term preservation of media stream quality. The adjustments may be based on target bit-rates for the media stream and/or target levels of smoothness. In another example, certain embodiments enable higher data-rates to be realized when resources are available. In particular, certain embodiments may enable signaling to an application of the media stream that additional resources are available for use in the wireless media stream. In this manner, the application may adjust the data rate of the stream immediately. Certain embodiments may have none, some, or all of the above-recited advantages. Other advantages may be readily apparent to one having skill in the art in light of the present disclosure.

EXAMPLE EMBODIMENTS

Embodiments of the present disclosure and its advantages are best understood by referring to FIGS. 1 through 7 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

The capacity of the wireless channel over which a media stream is transmitted may change over time. As a result, the quality of the media stream may drop due to scheduling less resources based on the measured channel quality and/or adapting the bit-rate for the media stream. Conventional techniques addressing these common drops in channel quality suffer from several drawbacks. For example, video compression methods typically do not work well with fast-changing bit-rates, and therefore, can cause large swings in perceived quality of the video stream. Further, as another example, application-layer bit-rate control schemes are not conventionally designed to handle fast-changing bandwidth and are typically designed to quickly reduce bit-rates in the event of a drop of the bandwidth, but slowly increase bit-rates when bandwidth becomes more plentiful.

Figure 1:
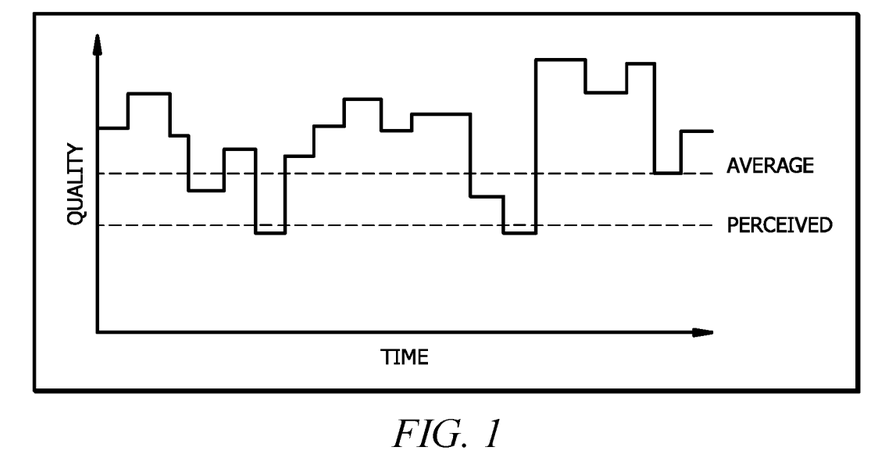
FIG. 1 is a graph of the quality of a media stream over time, in accordance with certain embodiments.

FIG. 1 illustrates an example graph of a video quality over time. It has been well-studied in the literature that fluctuations in the available bandwidth of a streaming media session tend to hurt end-user quality-of-experience (QoE). This can be attributed to two factors. First, subjective studies have shown that viewers' response to quality variation in a streaming video session is more sensitive to the low-quality region than to the high-quality region. As a result, a viewer experiences a streaming session fluctuating between two quality levels as worse compared to a streaming session that remains stable at an intermediate quality level at the same average rate. For example, the graph provided in FIG. 1 illustrates that the perceived quality level is significantly lower than the actual average quality level.

Second, conventional congestion control schemes for interactive media are conservative in probing for additional bandwidth but quick in reacting to a perceived increase in congestion by drastically lowering the streaming rate. Accordingly, a transient drop (e.g., 1 second) in wireless channel quality may lead to an immediate reduction in streaming rate and then slow recovery on the order of 10s of seconds, leading to suboptimal user QoE. Based on these shortcomings, improved apparatuses and methods are desired to smooth out temporary fluctuations in wireless channel quality and induce a more stable rate adaptation behavior by the streaming media application.

Described herein are solutions addressing one or more of the technical problems identified above. For example, certain embodiments describe apparatuses, systems, and methods that efficiently control the scheduling of resources for media streams in response to changing channel conditions. The scheduling of resources may be improved by an access point configured to revise the allocation of resources based on a target bit-rate and target level of smoothness. In particular, a regular allocation may occur based on the instantaneous or short-term channel quality measurements, and then the allocation may be revised to compensate for temporary channel disruptions of an individual stream. Accordingly, the fairness of resource allocation in the long-term may be preserved.

Figure 2:
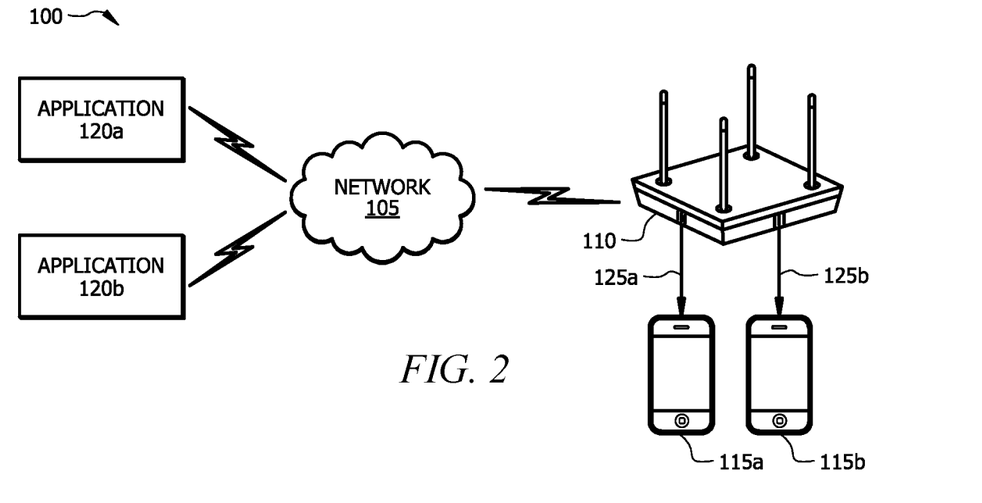
FIG. 2 illustrates an example network with a wireless access point serving at least two media streams to wireless devices, in accordance with certain embodiments.

For simplicity, FIG. 2 illustrates wireless network 100 with network 105 over which data may be provided from one or more applications 120 to wireless devices 115 through wireless access point (AP) 110. In practice, a wireless network may further include any additional elements suitable to support communication between wireless devices, access points, and/or applications, or between a wireless device, access point, and/or application and another communication device, such as a landline telephone, a service provider, or any other network node or end device. Wireless network 100 may provide communication and other types of services to one or more wireless devices to facilitate the wireless devices' or access point's access to and/or use of the services provided by, or via, the wireless network.

AP 110 may serve wireless device 115A with a first media stream 125A and wireless device 115B with second media stream 125B. In certain embodiments, AP 110 may serve first media stream 125A and second media stream 125B concurrently over some period of time.

For example, application 120A may communicate over network 105 data requested by wireless device 115A and AP 110 may stream that data, e.g., in media stream 125A to wireless device 115A using wireless resources allocated by AP 110. Similarly, application 120B may communicate over network 105 data requested by wireless device 115B and AP 110 may stream that data, e.g., in media stream 125B to wireless device 115B using wireless resources allocated by AP 110.

Although illustrated as two wireless devices 115 receiving two media streams 125 from two applications 120 via AP 110, any suitable configuration with two (or more) media streams 125 from AP 110 are contemplated herein. For example, there may be only a single wireless device 115 receiving two separate media streams 125 from AP 110. As another example, there may be only a single application 120 that is sending data for two (or more) media streams 125 to separate wireless devices 115 via AP 110. In this manner, AP 110 may provide two or more media streams to wireless devices 115 from applications 120.

Wireless network 100 may comprise and/or interface with any type of communication, telecommunication, data, cellular, and/or radio network or other similar type of system. In some embodiments, wireless network 100 may be configured to operate according to specific standards or other types of predefined rules or procedures. Thus, particular embodiments of wireless network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Wireless network 100 and/or network 105 may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, wireless network 100 and/or network 105 may comprise any number of wired or wireless networks, network nodes, base stations, controllers, wireless devices, relay stations, and/or any other components or systems that may facilitate or participate in the communication of data and/or signals whether via wired or wireless connections.

As used herein, network node 105 refers to equipment capable, configured, arranged and/or operable to communicate directly or indirectly with a wireless device, wireless access point and/or with other network nodes or equipment in the wireless network to enable and/or provide wireless access to the wireless device and/or to perform other functions (e.g., administration) in the wireless network. For example, network node 105 may include an access point (APs) (e.g., radio access points or WiFi APs), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Network node 105 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, network node 105 may be a virtual network node. More generally, however, network node 105 may represent any suitable device (or group of devices) capable, configured, arranged, and/or operable to enable and/or provide a wireless device with access to wireless network 100 or to provide some service to a wireless device, such as wireless node 115, that has accessed the wireless network.

As used herein, AP 110 and/or wireless devices 115 may include any device capable, configured, arranged and/or operable to communicate wirelessly with network nodes and/or other wireless devices. In certain embodiments, AP 110 and/or wireless devices 115 includes a user equipment (UE) configured to communicate on an LTE or 5G NR network or a wireless access point configured to communicate according to one or more wireless standards, such as WiFi.

Communicating wirelessly may involve transmitting and/or receiving wireless signals using electromagnetic waves, radio waves, infrared waves, and/or other types of signals suitable for conveying information through air. In some embodiments, AP 110 and/or wireless devices 115 may be configured to transmit and/or receive information without direct human interaction. For instance, AP 110 and/or wireless devices 115 may be designed to transmit information to a network on a predetermined schedule, when triggered by an internal or external event, or in response to requests from the network.

Examples of AP 110 and/or wireless devices 115 include, but are not limited to, a wireless access point, a wireless router, a wireless repeater, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

Applications 120 may be any applications configured to provide one or more streams of data. Applications 120 may be hosted on or implemented in any suitable combination of hardware and/or software, such as on a database or server hosting media content. In certain embodiments, one or more applications 120 may be hosted on a cloud or distributed service. Applications 120 may be any suitable media-serving applications. For example, application 120 may be an application that serves video and/or audio data over wireless network 100 and/or network 105. Application 120 may include a music-streaming application for serving music files and streams over wireless network 100 and/or network 105. As another example, application 120 may include a movie or tv-streaming application for serving video files and streams over wireless network 100 and/or network 105. As yet another example, application 120 may include a video-conferencing application that serves live video and/or audio to conference participants via wireless devices 115. As another example, application 120 may include a high-definition augmented reality (AR) or virtual reality (VR) media content stream destined for wireless devices 115.

Generally, AP 110 may allocate the resources used for first and second media streams 125A/B. For example, AP 110 may allocate resources proportionally to requested data transfers based on a variety of factors, including, but not limited to, the amount of data requested, the channel conditions between AP 110 and each of wireless devices 115, etc. For example, the quality of media streams 125 may be based on the resources allocated and data rate from each of applications 120.

Conventionally, resources may be allocated based on the instantaneous (e.g., over a short time period) measurements of the channel quality between AP 110 and each of wireless devices 115. For example, if the channel quality suddenly drops by 40%, the resource allocation may drop the relative allocation to a media stream over that channel proportionally to the channel quality drop. As a result, conventional allocation techniques may result in harsh "shocks" or drops in the streaming quality of the media streams. These drops in stream quality are the type of changes in quality that users perceive readily and cause restarts and restreaming of data in an effort to resolve the perceived quality issue. Additionally, the sharp drops may be slow to recover, because even if the channel quality recovers shortly after the drop, the application, such as application 120, may remain sending data to AP 110 for the media stream at the lower data rate until it determines that a higher data rate can be supported.

According to embodiments disclosed herein, improved access points, such as AP 110, address the problems with time-variant wireless channel conditions by allocating radio resources to mitigate the effects of drops in wireless channel quality on the quality of media streams over wireless networks.

Figure 3:
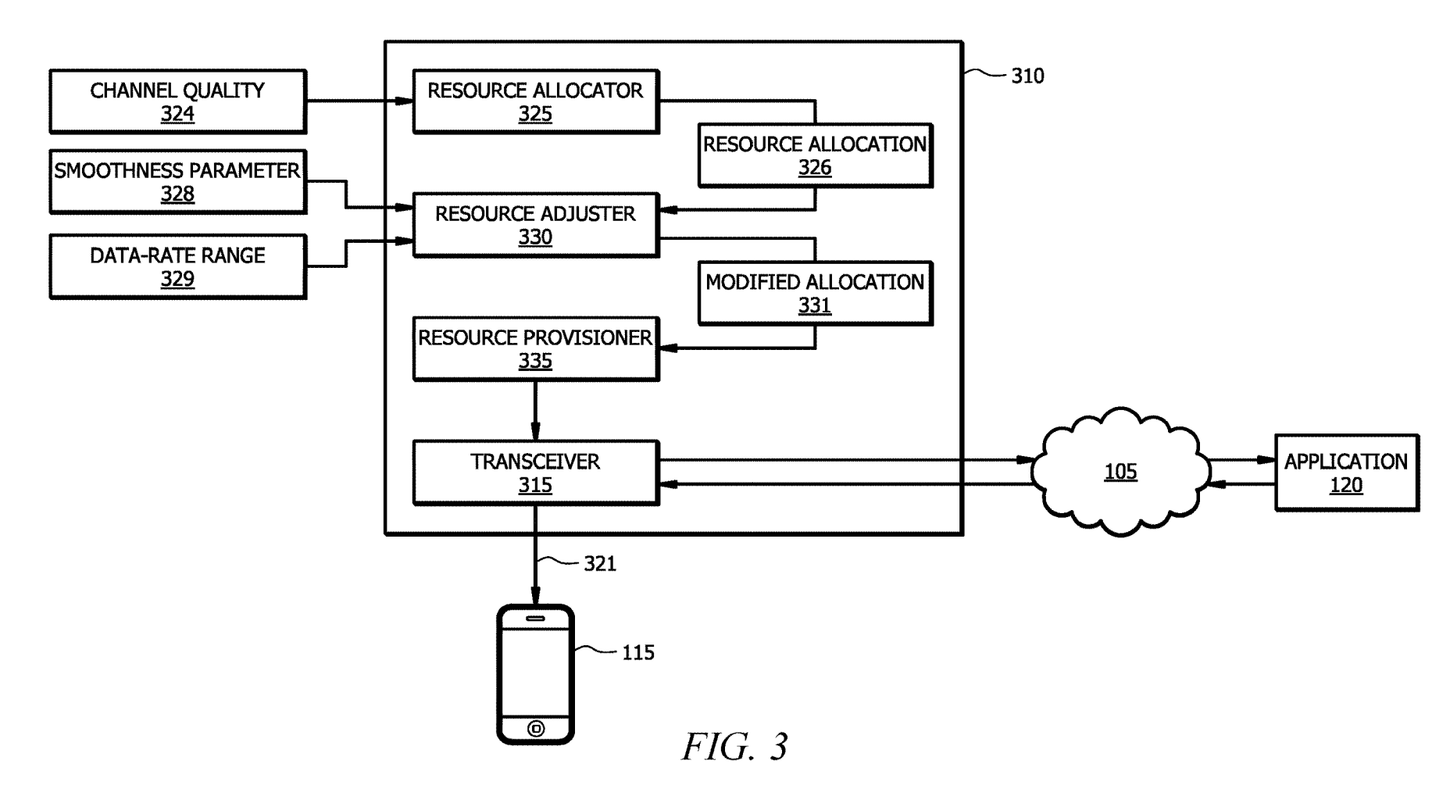
FIG. 3 illustrates a first configuration of a wireless access point, such as the wireless access point in FIG. 2, in accordance with certain embodiments.

FIG. 3 illustrates a first configuration of a wireless access point (AP) 310, in accordance with certain embodiments. In certain embodiments, AP 110 described above with respect to FIG. 1 may be configured in a like manner to AP 310 illustrated in FIG. 3.

AP 310 may allocate resources in a more efficient or suitable manner to prevent sudden drops in quality of media streams. In certain embodiments, AP 310 receives data from application 120, e.g., over network 105 via transceiver 315. AP 310 may stream the data to wireless device 115 via a media stream, e.g., one of media stream 125, as described above.

When AP 310 receives the data from application 120, it allocates radio resources to provide the media stream. In certain embodiments, AP 310 may include a resource allocation 325 that uses at least channel quality information 624 to determine how to allocate the available wireless resources at AP 310.

For example, AP 310 may allocate resources based on the instantaneous (or short-term) measurements made of the channel quality between AP 310 and wireless device 115 and the channel qualities of all other wireless connections and streams involving AP 310. For example, if the channel quality 624 indicates that the quality of the wireless channel between AP 310 and wireless device 115 carrying the media stream has dropped, then resource allocator 625 may allocate fewer resources, e.g., resource units or RUs as used in orthogonal frequency division multiple access (OFDMA) scheduling, to the stream.

Accordingly, resource allocator 325 of AP 310 may provide an initial resource allocation 626. In certain embodiments, resource allocation 626 may be an explicit resource allocation allocating how may RUs and the number of tones to be used for the RUs to carry the media stream. Alternatively, resource allocation 626 may represent a proportional or intermediate allocation indication that can be used to provision the resources for the wireless transmission(s). For example, in certain embodiments, AP 310 includes resource provisioner 635 that provisions the resources for use in the media streams based on resource allocation 626 and any other constraints, such as other media streams or standard implementation considerations.

In certain embodiments, AP 310 further includes a resource adjuster 630 that adjusts resource allocation 626 before the resources are provisioned and used for the media stream to wireless device 115. For example, resource adjuster 630 may adjust up or down the relative amount of resources that should be provisioned for a media stream based on the longer-term characteristics of the wireless channel quality for stream 321. In one example, resource adjuster 630 may smooth out temporary drops in resource allocation to stream 321 that could drastically reduce the quality of stream 321.

For example, resource allocator 325 may reduce the allocation for stream 321 to wireless device 115 by 40% based on a relative wireless channel quality drop by a proportional amount. Resource adjuster 330 may then upwardly revise the resource allocation by a certain percentage or proportion such that the drop in quality is minimal or reduced significantly.

In some embodiments, the adjustments by resource adjuster 330 are made only on temporary drops in wireless channel quality. For example, resource adjuster 330 may account for the longer-term trends of the wireless channel quality of media stream 321 to wireless device 115 in allowing for some drop in resource allocation. In particular, if wireless device 115 is in an increasingly noisy or congested location, the wireless channel quality may decrease over a longer period of time than if a person or bus temporarily blocks a signal path for the wireless signals carrying media stream 321.

In particular, in some embodiments, resource adjuster 330 may reduce the drop in resource allocation based on a predetermined smoothness parameter 328 and/or data-rate range 329 for media stream 321. For example, smoothness parameter 328 and/or data-rate range 329 may be incorporated into the determination by resource adjuster 330 to adjust resource allocation 626. The parameters may enable resource adjuster 330 to incorporate longer-term channel quality trends when considering how to address instantaneous or short-term drops in channel quality to prevent large drops in quality of the media stream 621.

In certain embodiments, smoothness parameter 328 represents a value or range of values indicating the preferred level of temporal smoothness by application 120 and/or wireless device 115. For example, application 120 may indicate to AP 310 smoothness parameter 328 or some indication thereof when application 120 initiates media stream 321 with wireless device 115 through AP 310. In certain embodiments, smoothness parameter 328 is obtained by AP 310 from a memory or external location, such as a central network controller, that includes such parameters defined for certain pre-registered categories of applications/ devices. In another embodiment, smoothness parameter 328 is obtained implicitly by traffic monitoring tools.

Additionally, data-rate range 329 may be a desired bandwidth range, e.g., from a minimum data rate R_min to a maximum data rate R_max, for media stream 321 served by application 120. As with smoothness parameter 328, AP 310 may obtain data-rate range 329 in one of a variety of ways.

For example, AP 310 may obtain data-rate range 329 from application 120, directly or indirectly, from a memory or external location, such as a central network controller, that includes such parameters defined for certain pre-registered categories of applications/devices, or implicitly by traffic monitoring tools. As shown in a particular, non-limiting example below, resource adjuster 330 of AP 310 may use these parameters in determining how to adjust resource allocation 326 to prevent sudden drops in media stream 321 quality.

According to a set of embodiments, AP 310 obtains both smoothness parameter 628 (indicated by "A") and data-rate range 629 (defined by "R_min" and "R_max"). AP 310 may monitor for each media stream, i, its recent instantaneous bandwidth (on the order of the timescale of the application) used in the previous slot and use that value as the target/ expected bandwidth R_target_i. As described above, resource allocator 625 may use channel quality 624 to determine a bandwidth allocation BW_i for the next slot, e.g., resource allocation 626.

In some embodiments, the bandwidth allocation is an allocation of resource units. AP 310 may then compute the predicted throughput (data-rate) R_i based on the updated channel state information (e.g., using existing procedures). In this manner, AP 310 may determine a "normal" or conventional bandwidth allocation, BW_i, and an expected and target data rates, R_i and R_target_i, which can be used to revise the conventional bandwidth allocation BW_i to obtain a revised bandwidth allocation BW_revised_i.

In certain embodiments, resource adjuster 330 determines a revised allocation based on smoothness parameter 328, e.g., in this example "A", and the difference between the expected and target data rates. For example, the allocation decision may be revised by "stretching" the original allocation ratio towards the direction of the target rate. In one particular example, BW_revised_i may be calculated by resource adjuster 330 using a predetermined formula. For example, the revision may be defined by the equation below:

$$BW\_revised\_i = BW\_i + A*(R\_target\_i - R\_i)/(R\_max) *BW\_total \quad (1)$$

BW_total may represent the full bandwidth of the current OFDMA transmission opportunity (TXOP) and, again, A is a scaling parameter tuned by the application preference on how smooth it wants to receive bandwidth.

The example determination of the adjusted bandwidth (or resource allocation) may result in the following behavior. First, when R_target_i is significantly higher than R_i, e.g., the wireless channel experienced by stream i encounters a temporary drop, the equation results in a higher allocation of bandwidth (BW_revised_i>BW_i). Accordingly, the resource adjustment can mitigate drastic drops in bandwidth experience by the stream. Similarly, when R_target_i is significantly lower than R_i, e.g., the wireless channel experienced by stream i encounters a temporary but brief improvement, the equation leads to a bandwidth allocation lower than the initial decision (BW_revised_i<BW_i) indicating more gradual change with respect to the expected streaming rate. Secondly, parameter A can be used to tune the level of smoothness desired by the application. For example, setting A to 0 results in no revisions in resource allocation.

In certain embodiments, AP 310 iterates through the adjustment process for each media stream i=1, . . . , N. For example, more than one media stream may require adjustment based on change in the wireless channel quality. In certain embodiments, AP 310 may obtain channel quality information, smoothness parameters, and data-rate ranges for each media stream it is serving. In some embodiments, the same information may be used for adjusting multiple resource allocations.

For example, some media streams may be streamed from the same application and/or have the same data-rate range or smoothness requirements or preferences. Once completed for each media stream, AP 310 may be further configured to renormalize the final RU allocation to ensure that different streams preserve their relative bandwidth allocation, and are all accommodated by the upcoming transmission opportunity. Then, RU assignment may be performed by the access point, e.g., in resource provisioner 335, in preparation of OFDMA-based transmission, e.g., via transceiver 315.

Accordingly, AP 310 may provide media stream 321 to wireless device 115 using modified allocation 331. As described above, the resource adjustment not only incorporates short-term characteristics, e.g., via channel quality 624, but also longer-term characteristics of the wireless channel quality. In particular, if the target data rate R_target_i is based on the bandwidth used in the previous transmission instance, then a constant drop in quality will eventually cause modified allocation 331 to reflect the lower channel quality. The rate at which this will converge may be based on smoothness parameter 628, e.g., A used in equation 1 above. In this manner, media stream 321 may not significantly drop in quality for temporary channel quality drops. As a result, negative impacts on the perception of media stream 321 may be mitigated, thereby reducing resources required to restart media stream 321.

In certain embodiments, the above-described embodiments may be compatible and complementary to existing OFDMA scheduling schemes. In particular, the adjustment by resource adjuster 330 may add a step of revision after normal operations of RU allocation. For example, resource adjuster 330 may be implemented in existing scheduler in an access point or implemented separately at an access point to modify the resource allocation before the assignment of resource units. In certain embodiments, the resource revision may be different for different media streams. For example, certain types of media streams and/or applications may have a different tradeoff between the agility of adaption and temporal smoothness of rate.

One advantage of certain embodiments described herein is that no modification may be required on the application-side, e.g., by application 120. Thus, existing applications may benefit from the improved access points described herein.

In certain embodiments, if explicit messaging mechanisms exist, AP 310 may be further configured to inform the recommended media rate to the media stream sources, e.g., application 120. In response, application 120 may adapt the data-rate of information for the media stream sent to AP 310 based on the indication of the revised media rate. As a result, application 120 may adjust the data-rate more quickly, e.g., when the channel quality significantly improves after a period of low quality.

Although AP 310 is described above in reference to resource units and wireless networks, such as Wi-Fi, using OFDMA scheduling, the techniques and solutions described herein may also apply to other systems based on OFDMA scheduling, such as in LTE or 5G NR systems, where the transmission resources are referred to as "resource blocks" instead of "resource units".

In certain embodiments, other resource allocation mechanisms at a wireless access point, such as prioritized scheduling, can also adopt the techniques described in reference to resource adjuster 330 of AP 310. As one example, the wireless access point may determine the relative ratio of air time spent in serving each stream using full transmission bandwidth as the resource allocation mechanism. In particular, the resource allocation may correspond to air time allocation via prioritized scheduling (e.g., the sharing of resources over time as opposed to bandwidth).

Certain embodiments described herein may adapt resource allocation for media streams in the event of new or terminated media streams. As described above, one goal of an access point, such as AP 310, is to provide a consistent throughput and latency for media application streams across the air. When the access point is communicating with a client via UL/DL OFDMA, the access point can schedule the RU's for the application streams so that the throughput/latency remain consistent based on the current conditions of the air. These conditions can be represented as the current modulation and coding scheme (MCS) and the recent packet error rate (PER) computed using transmission acknowledgments.

The RU allocation for a scheduled transmission event of data from a media stream may account for MCS and PER so that it can maintain a consistent throughput/latency. Other lower priority data that is not of the media type may be delayed to accommodate the scheduled transmission.

In the event of a new media stream, certain embodiments cause the allocation of RUs for the stream given a derived worst case MCS/PER at the beginning of the stream transmission. This derived worst case can be computed based on historical observations of traffic behavior that the access point has seen in the recent past. At each scheduled transmission event, the access point can take the actual MCS/PER at the time of the event and reduce the RU allocation for the packets of the stream being transmitted (DL) or received (UL) appropriately, freeing RU's for transmission/reception of lower priority data that may be queued.

This approach may be referred to as a "scale down" process. According to other embodiments, an initial optimal RU allocation may be chosen based on current MC S/PER values at the start of stream transmission the allocation is increased appropriately to achieve the consistent throughput/latency at each transmission event. This may be referred to as a "scale up" process.

In certain embodiments, AP 310 may need to occasionally adjust down the consistent throughput (or the consistent latency) of a stream as new media streams appear given finite bandwidth limitations of the system. As described herein, this adjustment may be made abruptly since the rate adaption algorithms can adjust rapidly down. For example, in certain embodiments, AP 310 may abstain from applying resource adjustment to resource allocation 326 in such cases. In particular, AP 310 may determine that the drop in resource allocation was not due to a drop in channel quality, but based on the introduction of a new media stream. Accordingly, AP 310 may not attempt to correct for the drop in resource allocation, because it could impact the establishment of the new stream. As other streams end, AP 310 may adjust the consistent throughput/latency for its active streams up to provide a better user experience for the application. This adjustment may be slower to match the rate adaption behavior in a suitable manner.

According to certain embodiments, AP 310 may be further configured to signal application 120 in response to determining an improved wireless channel quality associated with the stream 321. For example, if modified allocation 331 includes an increase of allocated resources for stream 321 served by application 120, AP 310 may indicate to application 120 that that additional transmission resources are available for use in stream 321. In particular examples, the indication may be an explicit indication of the amount of resources allocated to stream 321 or another indication that implicitly signals an increase of resources (e.g., plainly an indication that resources have been increased or an indication of the amount of the increase). In this manner, AP 310 may help alleviate the lag of bit-rate recovery at application 120. In particular, as discussed above, application 120 may be configured to slowly to increase bit-rates after reducing them in response to low signal quality/reduction in allocated resources. In certain embodiments, AP 310's indication of an increase of resources may allow application 120 to increase the bit-rates more rapidly and/or use a modified algorithm or procedure to increase bit-rates.

Figure 4:
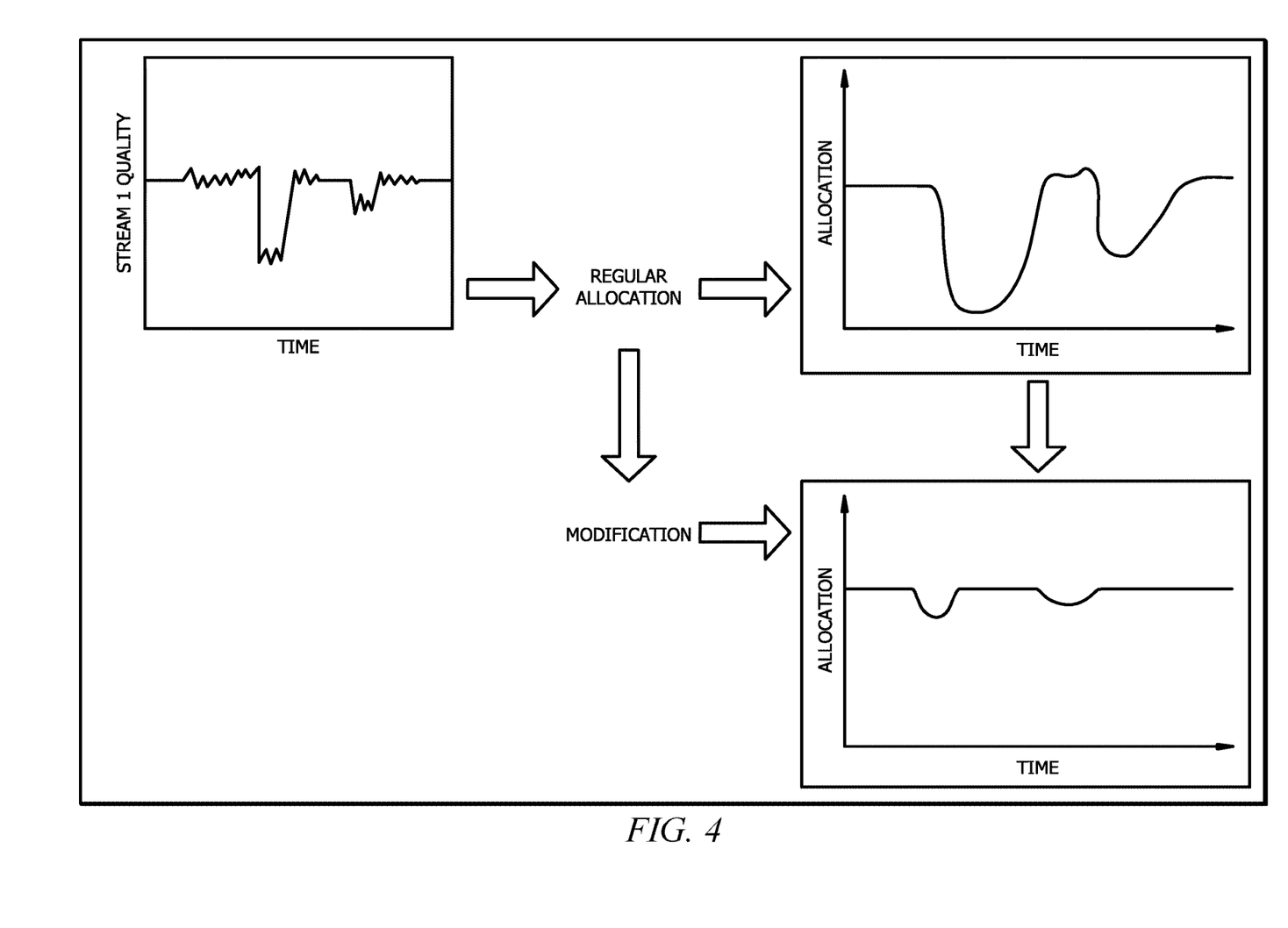
FIG. 4 illustrates a graphical representation of a dynamic resource unit allocation for a media stream, in accordance with certain embodiments.

FIG. 4 illustrates a graphical representation of a dynamic resource unit allocation for a media stream, in accordance with certain embodiments. FIG. 4 illustrates one example of resource allocation 626 and modified allocation 330 as described above in reference to FIG. 3.

The graph on the left illustrates the situation when the wireless channel quality drops drastically. As described above, the access point may calculate the expected throughput given the default RU allocation and compare it against the previously obtained throughput of the same media stream (identified as in the same traffic identifier queue). The default RU allocation as shown on the top left may be modified to compensate for drastic drops in the streams available bandwidth by "upgrading" it to a larger portion of the total channel bandwidth, e.g., as shown in the bottom right.

According to a particular example, the modification of the allocation may correspond to choosing a RU-52 (a 52-tone resource unit) instead of RU-26 (a 26-tone resource unit) for the given user during a temporary dip in channel quality, when OFDMA scheduling is used. When the channel quality recovers, the allocation may automatically fall back to the unrevised default RU allocation based on the long-term average throughput. As a result, the available bandwidth as experienced by the application stays at a moderate level during transients of bad channel condition.

Figure 5:
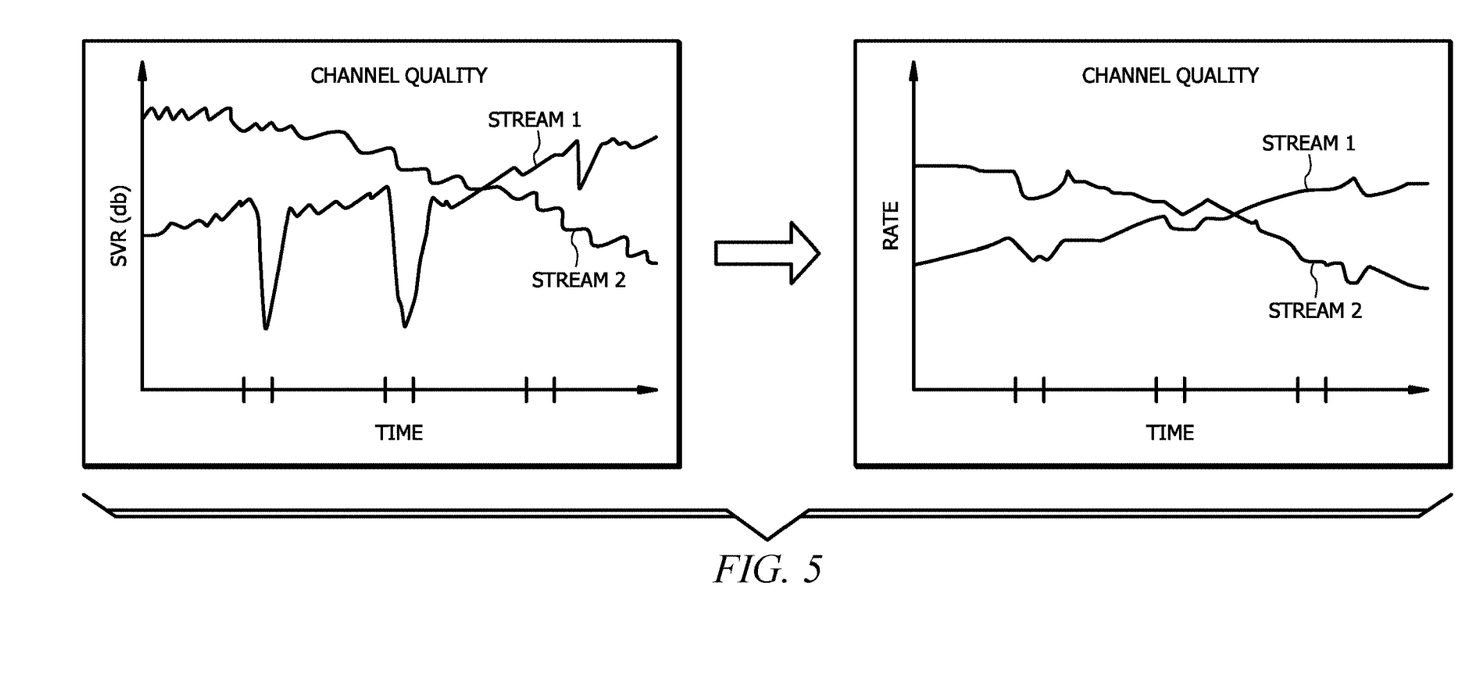
FIG. 5 includes graphs of the observed channel quality and the preferred data streaming rate with dynamic adjustment over the same time period for two media streams, in accordance with certain embodiments.

FIG. 5 includes graphs of the observed channel quality and the preferred data streaming rate with dynamic adjustment over the same time period for two media streams, in accordance with certain embodiments. As mentioned above, the access point may iterate across multiple media streams to adjust each resource allocation. In some embodiments, only one media stream may experience a temporary drop in channel quality.

For example, the graph on the right illustrates a first channel quality for a first stream and a second channel quality of a second stream over a period of time. The general trend of the first stream is an increase in quality, but also suffers temporary drops in quality in the indicated time periods. In contrast, the general trend of the second stream is a decrease in quality but without significant temporary drops in quality. In conventional allocations of resources, the bandwidth allocated to the first media stream would be characterized by large drops in bandwidth during the indicated time periods and little to no change in the bandwidth allocated to the second media stream (outside small adjustments over the long-term decline of the channel quality).

However, as described herein, an improved access point, e.g., AP 310 as described above, may reduce the large dips in channel quality by smoothing out the resulting resource allocation. In particular, during the transient periods where the channel quality of the first stream is disrupted, the dynamic RU allocation scheme as described herein ensures a moderate allocation to the first stream at the expense of moderate rate degradation in the second stream.

For example, the graph on the right of FIG. 5 illustrates the smaller dips in resource allocation (e.g., stream quality) for both the first and second media streams in an effort to mitigate large drops in the first media stream, which may cause serious degradation of the first media stream. In certain embodiments, the balance between the media streams may be accomplished during the renormalization process where the resource allocation for each media stream is renormalized after the adjustments.

As a particular example, consider two streams with equal previous bandwidths B. If a first stream channel quality drops to a level corresponding to B/2 and the second stream stays the same at B, then the new total bandwidth is (3/2)B (as opposed to the previous 2B bandwidth). If the resource modification causes both streams to share the drop in bandwidth, each media stream may be allocated resources supporting a bandwidth of (3/4)B. In this example, both allocated bandwidths dropped by (1/4)B, even though only one media stream experienced a drop in channel quality. This may be advantageous in situations where the bandwidth of (3/4)B will support the same bit-rate transmission for the first and second media streams, but a lower bandwidth would not. In that case, the adjustment may prevent the temporary adoption of a lower-data rate for the first media stream, which may take longer to recover than the recovery of the wireless channel quality. Accordingly, the techniques described herein may be reflected in the resource allocation for each of the one or more media streams served by the access point, such as AP 310 described above.

Although the examples describe above in reference to FIGS. 4 and 5 refer to a resource unit assignment, the assignment and revision of the assignment any other suitable resource is also contemplated herein. For example, resources for LTE or NR 5G may also be contemplated herein, e.g., resource blocks (RBs) or any other resource elements assigned and used in such systems.

Figure 6:
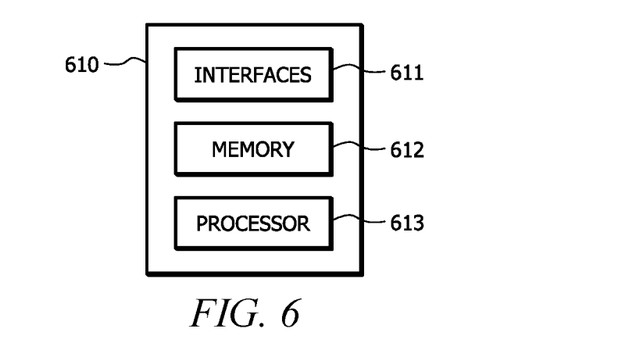
FIG. 6 illustrates a second configuration of a wireless access point, such as the wireless access point in FIG. 2, in accordance with certain embodiments.

FIG. 6 illustrates a second configuration of a wireless access point 610, according to certain embodiments. In certain embodiments, AP 110 and/or AP 310 are configured in a like manner. AP 610 includes one or more interfaces 611, a memory 612 and a processor 613. AP 610 may include multiple sets of one or more of the illustrated components for different wireless technologies supported by AP 610, such as, for example, GSM, WCDMA, LTE, NR, WiFi, WiMAX, or Bluetooth wireless technologies, just to mention a few. These wireless technologies may be integrated into the same or different chips or set of chips as other components within AP 610.

Interfaces 611 may include one or more antennas or antenna arrays, configured to send and/or receive wireless signals. In certain alternative embodiments, interfaces 611 may not include an antenna, but may include an interface for interfacing with an external antenna connectable to AP 610 through one of interfaces 611. Interfaces 611 and/or processor 613 may be configured to perform any receiving or transmitting operations described herein as being performed by AP 610, respectively. Any information, data and/or signals may be received from a network node and/or another wireless node.

In certain embodiments, interfaces 611 includes one or more of radio front end circuitry and an antenna. For example, interfaces 611 may include one or more filters or amplifiers that is connected to transmission components. In some embodiments, interfaces 611 are configured to or receive analog or digital data that is sent out to other nodes or terminal devices via a wireless connection. In some embodiments, interfaces 611 may include circuitry configured to convert data from digital to analog and vice versa. Signals and data received may be passed to processor 613, respectively. Accordingly, interfaces 611 may include any suitable interfacing components for receiving and/or transmitting wireless communications.

In certain embodiments, interfaces 611 may also include one or more interfaces for communicating between different components of AP 610, including any components described in FIG. 2 of AP 110 or in FIG. 3 of AP 310, such as transceiver 315, resource allocator 625, resource adjuster 330, and resource provisioner 635.

Processor 613 may include be any electronic circuitry, including, but not limited to microprocessors, application specific integrated circuits (ASIC), application specific instruction set processor (ASIP), and/or state machines, that communicatively couples to memory 612 respectively, and controls the operation of AP 610. Processor 613 may be 8-bit, 16-bit, 32-bit, 64-bit or of any other suitable architecture. Processor 613 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 613 may include other hardware and software that operates to control and process information.

Processor 613 executes software stored on memory 612, to perform any of the functions described herein. For example, processor 613 may control the operation and administration of AP 610 by processing information received from memory 612, or any external databases, or any other components of the wireless network in which it is deployed. In certain embodiments, processor 613 may be configured to carry out one or more functions of AP 110 and/or AP 310, or any components thereof, such as transceiver 315, resource allocator 625, resource adjuster 330, and resource provisioner 635.

Processor 613 may be a programmable logic device, a microcontroller, a microprocessor, any suitable processing device, or any suitable combination of the preceding. Processor 613 is not limited to a single processing device and may encompass multiple processing devices. In certain embodiments, processor 613 includes one or more of wireless transceiver circuitry, wireless signal processing circuitry, and application processing circuitry. In other embodiments, the processor 613 may include different components and/or different combinations of components. In certain embodiments processor 613 includes a system on a chip. In some embodiments, processor 613 or components thereof may be on a single chip, separate chips, or a set of chips.

Memory 612 may store, either permanently or temporarily, data, operational software, or other information for processor 613. In certain embodiments, memory 612 may store information such as channel quality 324, smoothness parameter 628, data-rate range 629, resource allocation 626, modified allocation 631, and any other information used in dynamically allocating resources, at AP 110 and/or AP 310. Memory 612 may include any one or a combination of volatile or non-volatile local or remote devices suitable for storing information.

For example, memory 612 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 612, a disk, a CD, or a flash drive. Memory 612 may be operable to store a computer program, software, an application including one or more of logic, rules, code, tables, etc. and/or other instructions capable of being executed by processor 613. In particular embodiments, the software may include an application executable by processor 613 to perform one or more of the functions described herein. In certain embodiments, memory 612 may be or implemented as a NoSQL database. In some embodiments, processor 613 and memory 612 may be considered to be integrated.

In certain embodiments, some or all of the functionality described herein as being performed by AP 610 (and AP 110 or AP 310) may be provided by processor 613, respectively, executing instructions stored on memory 612, respectively, which in certain embodiments may be a computer-readable storage medium. In alternative embodiments, some or all of the functionality may be provided by processor 613 without executing instructions stored on a separate or discrete device readable storage medium, such as in a hard-wired manner. In any of those particular embodiments, whether executing instructions stored on a device readable storage medium or not, processor 613 can be configured to perform the described functionality.

Processor 613 may be configured to perform any determining, calculating, or similar operations (e.g., certain obtaining operations) described herein as being performed by AP 610 (and AP 110 and/or AP 310). These operations, as performed by processor 613, may include processing information obtained by processor 613 by, for example, converting the obtained information into other information, comparing the obtained information or converted information to information stored by AP 610 (and AP 110 and/or AP 310), and/or performing one or more operations based on the obtained information or converted information, and as a result of said processing making a determination.

In particular embodiments, one or more functions described herein relating to AP 610 (and AP 110 and/or AP 310) may be implemented using one or more interfaces 611, memory 612, and processor 613, their equivalents, or any suitable combination of hardware and software as understood by persons having skill in the art capable of carrying out one or more functions or methods described herein.

Figure 7:
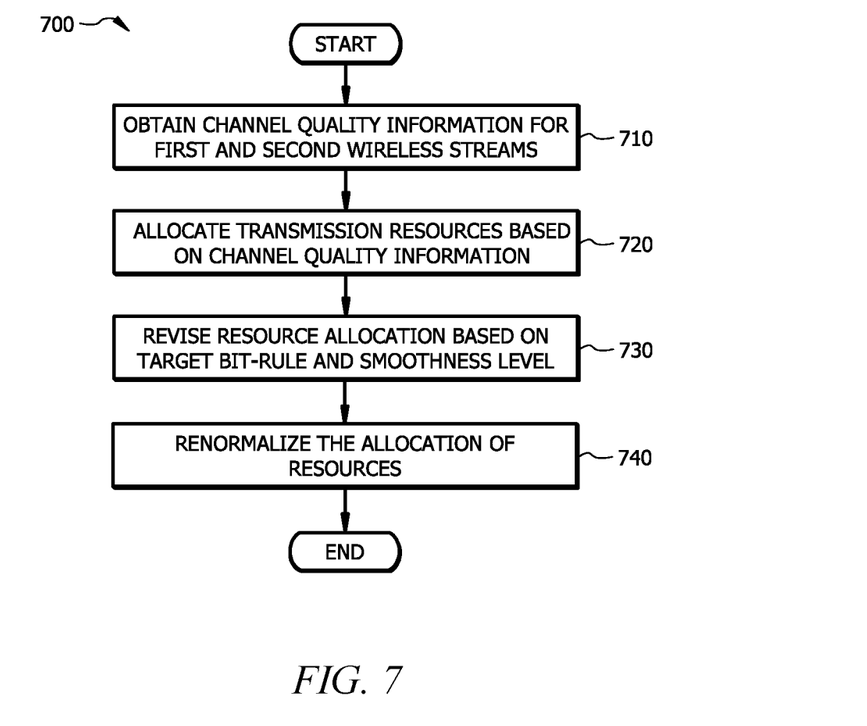
FIG. 7 is a flowchart diagram of an example method in a wireless access point, in accordance with certain embodiments.

FIG. 7 is a flowchart diagram of an example method 700 in a wireless access point, such as AP 110, AP 310, and/or AP 610, in accordance with certain embodiments. At step 710, characteristics of a first wireless stream and a second wireless stream are obtained. For example, an access point may measure or obtain the wireless channel qualities for each of a first media stream and a second media stream that is served by the access point. The media stream characteristics may be used by the access point to determine what resources to provision for transmissions carry information on the next transmission opportunity, e.g., to one or more wireless devices, such as wireless devices 115.

At step 720, resources may be allocated for the first wireless stream and the second wireless stream based on the obtained information. For example, the instantaneous or short-term channel quality information may be used to determine the relative resource allocation between at least the first and second wireless streams. For example, in certain embodiments, the channel quality may temporarily drop, e.g., in response to a mobile object being positioned in the signal path or a source of interfering signals is operating nearby, for one or more of the wireless streams. Accordingly, that stream may be allocated fewer resources, which may cause the quality of that stream to suffer, sometimes significantly.

At step 730, in response to a drop in quality of the first wireless stream, the allocation of resources may be revised for the first wireless stream based on a target bit-rate and a target level of smoothness. For example, AP 310 may revise resource allocation 326 to obtain modified allocation 331, as described herein, in accordance with certain embodiments. In some embodiments, method 700 may further include a step of obtaining one or more of the target bit rate and target level of smoothness. For example, one or more of these values may be obtained from a source of the media stream, directly or indirectly, implicitly based on the type of media stream of each of the first and second wireless streams, and/or based on predetermined or default values associated with the type of the wireless streams or applications serving the data to be transferred in the wireless streams. In this manner, the potential drop in quality of the first wireless stream may be mitigated when there is a drop in wireless channel quality.

In some embodiments, the revision of resources only occurs when the drop in channel quality of the first wireless stream exceeds a threshold amount (or percentage). For example, small drops of 1-5% may not be required to be mitigated or are within normal fluctuations. In this manner, unnecessary processing to determined revised allocations may be avoided when such revisions would have little to no impact.

In certain embodiments, the revision in step 730 may be repeated for each wireless stream, e.g., for both the first wireless stream and the second wireless stream served by the wireless access point. In this manner, a revised allocation may be obtained for each wireless stream that is served by the access point.

According to certain embodiments, method 700 includes the additional step 740, in which the allocation of transmission resources is renormalized after the revision in step 730. For example, the revision of the allocation of resources may increase the allocation of resources to the first wireless stream without revising the allocation to the second wireless stream. Since there is a finite amount of wireless resources, the overall allocation may be renormalized to ensure that the revised allocations correspond to the available network resources. As a particular example, if the initial allocation of transmission of resources, e.g., in step 720, provides 50% of available resources to both the first and second wireless streams and the allocation to the first wireless stream is increased by 20% (e.g., now 60% of the overall amount of resources), then the total allocation of resources is 50%+60%=110%. This can be renormalized such that the total allocation is 100% with approximately 54.54% allocated to the first wireless stream and 45.46% allocated to the second wireless stream. In this manner, the amount of resources allocated does not exceed the capacity of the wireless access point, but is instead renormalized after the revision of the allocation based on the detected change in wireless quality.

Modifications, additions, or omissions may be made to method 700 depicted in FIG. 7. Method 700 may include more, fewer, or other steps. For example, in certain embodiments, method 700 may further include determining whether the drop in quality of the first wireless stream is based on the introduction of a third wireless stream abstaining from revising the allocation of resources if based on the introduction of a new stream. In this manner, quick adjustments in the media stream quality are allowed to allow the new stream to become established. In another set of embodiments, method 700 further includes revising the allocation of resources for the second wireless stream based on a second target bit-rate and a second target level of smoothness. For example, there may be concurrent drops in wireless quality for multiple streams served by the access point. In this manner, the wireless access point may adjust each resource allocation, e.g., a proportional resource allocation, which can be renormalized before the resources are assigned.

Additionally, steps may be performed in parallel or in any suitable order. While discussed as AP 310 as performing certain steps, any suitable component of AP 310, AP 110, and/or AP 610 may perform one or more steps of the methods. Additionally, method 700 may include any suitable step to carry out any of the described functions of second AP 310, AP 110, and/or AP 610. Further, any of steps of method 700 may computerized and/or carried out using hardware, such as processor 613 of AP 6100, or any other suitable system implementing one or more components of AP 310, AP 110, and/or AP 610, such as any hardware or software implementing resource allocator 325, resource adjuster 330, resource provisioner 335, or transceiver 315.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. An apparatus comprising one or more processors and a memory storing instructions that, when executed by the one or more processors, cause the one or more processors to perform operations comprising:
    obtaining information characterizing a first wireless stream and a second wireless stream, wherein the information comprises at least a wireless channel quality for each of the first wireless stream and the second wireless stream;
    allocating transmission resources to the first wireless stream and the second wireless stream based on the information;
    revising, in response to a change in the wireless channel quality of the first wireless stream, an allocation of the transmission resources for the first wireless stream; and
    communicating a signal to a media streaming application that provides at least the first wireless stream in response to determining an improved wireless channel quality associated with the first wireless stream, wherein the signal indicates to the media streaming application that additional transmission resources are available for use in the first wireless stream.

2. The apparatus of claim 1, wherein revising the allocation of the transmission resources comprises increasing an allocation ratio for the first wireless stream.

3. The apparatus of claim 1, the operations further comprising revising, in response to a change in the wireless channel quality of the second wireless stream, an allocation of the transmission resources for the second wireless stream.

4. The apparatus of claim 1, the operations further comprising renormalizing an allocation of the transmission resources for the first wireless stream and the second wireless stream based on a revised allocation of the transmission resources of at least the first wireless stream.

5. The apparatus of claim 1, the operations further comprising:
using orthogonal frequency division multiple access (OFDMA) scheduling in allocating the transmission resources to the first wireless stream and the second wireless stream; and
revising the allocation of the transmission resources for the first wireless stream by changing a bandwidth of one or more transmission resources allocated to the first wireless stream.

6. The apparatus of claim 1, the operations further comprising adjusting, in response to a termination of the second wireless stream, a target bit-rate of the first wireless stream, wherein the allocation of the transmission resources for the first wireless stream is revised based on an adjusted target bit-rate.

7. The apparatus of claim 1, the operations further comprising:
using prioritized scheduling in allocating the transmission resources to the first wireless stream and the second wireless stream; and
revising the allocation of the transmission resources for the first wireless stream by changing an air time allocation of the transmission resources allocated to the first wireless stream.

8. A method, comprising:
obtaining information characterizing a first wireless stream and a second wireless stream, wherein the information comprises at least a wireless channel quality for each of the first wireless stream and the second wireless stream;
allocating transmission resources to the first wireless stream and the second wireless stream based on the information;
revising, in response to a change in the wireless channel quality of the first wireless stream, an allocation of the transmission resources for the first wireless stream; and
communicating a signal to a media streaming application that provides at least the first wireless stream in response to determining an improved wireless channel quality associated with the first wireless stream, wherein the signal indicates to the media streaming application that additional transmission resources are available for use in the first wireless stream.

9. The method of claim 8, wherein revising the allocation of the transmission resources comprises increasing an allocation ratio for the first wireless stream.

10. The method of claim 8, further comprising revising, in response to a change in the wireless channel quality of the second wireless stream, an allocation of the transmission resources for the second wireless stream.

11. The method of claim 8, further comprising renormalizing an allocation of the transmission resources for the first wireless stream and the second wireless stream based on a revised allocation of the transmission resources of at least the first wireless stream.

12. The method of claim 8, further comprising:
using orthogonal frequency division multiple access (OFDMA) scheduling in allocating the transmission resources to the first wireless stream and the second wireless stream; and
revising the allocation of the transmission resources for the first wireless stream by changing a bandwidth of one or more transmission resources allocated to the first wireless stream.

13. The method of claim 8, further comprising adjusting, in response to a termination of the second wireless stream, a target bit-rate of the first wireless stream, wherein the allocation of the transmission resources for the first wireless stream is revised based on an adjusted target bit-rate.

14. The method of claim 8, further comprising:
using prioritized scheduling in allocating the transmission resources to the first wireless stream and the second wireless stream; and
revising the allocation of the transmission resources for the first wireless stream by changing an air time allocation of the transmission resources allocated to the first wireless stream.

15. One or more non-transitory computer-readable storage media embodying instructions that, when executed by a processor, cause the processor to perform operations comprising:
obtaining information characterizing a first wireless stream and a second wireless stream, wherein the information comprises at least a wireless channel quality for each of the first wireless stream and the second wireless stream;
allocating transmission resources to the first wireless stream and the second wireless stream based on the information;
revising, in response to a change in the wireless channel quality of the first wireless stream, an allocation of the transmission resources for the first wireless stream; and
communicating a signal to a media streaming application that provides at least the first wireless stream in response to determining an improved wireless channel quality associated with the first wireless stream, wherein the signal indicates to the media streaming application that additional transmission resources are available for use in the first wireless stream.

16. The one or more non-transitory computer-readable storage claim 15, wherein revising the allocation of the transmission resources comprises increasing an allocation ratio for the first wireless stream.

17. The one or more non-transitory computer-readable storage claim 15, the operations further comprising revising, in response to a change in the wireless channel quality of the second wireless stream, an allocation of the transmission resources for the second wireless stream.

18. The one or more non-transitory computer-readable storage claim 15, the operations further comprising renormalizing an allocation of the transmission resources for the first wireless stream and the second wireless stream based on a revised allocation of the transmission resources of at least the first wireless stream.

19. The one or more non-transitory computer-readable storage claim 15, the operations further comprising:
using orthogonal frequency division multiple access (OFDMA) scheduling in allocating the transmission resources to the first wireless stream and the second wireless stream; and
revising the allocation of the transmission resources for the first wireless stream by changing a bandwidth of one or more transmission resources allocated to the first wireless stream.

20. The one or more non-transitory computer-readable storage claim 15, the operations further comprising adjusting, in response to a termination of the second wireless stream, a target bit-rate of the first wireless stream, wherein the allocation of the transmission resources for the first wireless stream is revised based on an adjusted target bit-rate.

* * * * *